US005227220A

United States Patent [19]

Biedermann

[11] Patent Number: 5,227,220

[45] Date of Patent: Jul. 13, 1993

[54] DECORATED OBJECT HAVING A SURFACE STRUCTURE

[76] Inventor: Andreas Biedermann, Im Magenbuch 128, 7965 Ostrach 3, Fed. Rep. of Germany

[21] Appl. No.: 781,121

[22] PCT Filed: May 2, 1991

[86] PCT No.: PCT/DE91/00369

§ 371 Date: Jan. 3, 1992

§ 102(e) Date: Jan. 3, 1992

[87] PCT Pub. No.: WO91/17062

PCT Pub. Date: Nov. 14, 1991

[30] Foreign Application Priority Data

May 3, 1990 [DE] Fed. Rep. of Germany ....... 4041159

[51] Int. Cl.[5] ........................ B32B 3/00; A47G 35/00

[52] U.S. Cl. .................................... 428/172; 428/156; 428/161; 428/163; 428/167; 428/542.2; 428/213; 428/913.3

[58] Field of Search ............... 428/156, 167, 161, 162, 428/172, 163, 542.2, 213, 913.3, 141

[56] References Cited

U.S. PATENT DOCUMENTS 4,138,515 2/1979 Dial ........................................ 428/30
4,447,473 5/1984 Mashida et al. ...................... 427/162
4,798,994 1/1989 Rijpers et al. ........................ 313/428
4,798,998 1/1989 Rijpers et al. ........................ 313/428
4,871,503 10/1989 Ishii et al. .......................... 264/248

FOREIGN PATENT DOCUMENTS 0220716 5/1987 European Pat. Off. .
0263541 4/1988 European Pat. Off. .
3704591 8/1987 Fed. Rep. of Germany .
8218618 5/1983 France .

*Primary Examiner*—Donald J. Loney
*Attorney, Agent, or Firm*—Spencer, Frank & Schneider

[57] ABSTRACT

A decorated object having a spacial surface structure which is formed of unevennesses of the surface. An optical interference layer system consisting of at least three layers of alternating refractive indices is applied directly onto the spacial surface structure. The unevennesses typically extend laterally more than 1 millimeter, wherein ambient light reflected from the optical interference layer system upon the spacial surface structure produces a play of colors.

5 Claims, 2 Drawing Sheets

DECORATED OBJECT HAVING A SURFACE STRUCTURE

FIELD OF THE INVENTION

The invention relates to objects whose exterior surfaces formed in a particular way in order to achieve an aesthetic effect.

The invention relates in particular to a decorated object which has a special surface structure that is formed from unevennesses and/or lacunae to which an optical interference layer system is applied.

PRIOR ART

A widespread method of decorating objects consists in providing the surface of the objects with a structure, structure being understood in the wider sense as a composition of elements that is in some way perceptible. These elements can be unevennesses of the surface structure, for example, or else areas of modified color.

A spacial surface structure, as opposed to a color-modified surface structure, which consists of unevennesses of the surface is also visually perceptible, although only through differences in brightness. As a rule, there are no color modifications to observe which are controlled by the unevenness of spacial structure.

A spacial surface structure which produces a play of color is a very interesting decorative possibility. A lot of expense is sometimes undertaken in order to produce such a combination of spacial and visual effects. One example of this is the production of cut glass. This glass uses the effect of dispersion of light, and it is indeed possible to produce colors from the surface structure.

However, close examination shows that this technique has substantial disadvantages. FIG. 1 represents a comparatively flat spacial surface structure. Set out in the associated Table 1 are the angles of the beam splitting for different angles of inclination of the surface. The beam splitting $\beta_f$-$\beta_c$ is a measure of the color effects of the structure. It can be seen from Table 1 that the beam splitting only becomes noticeable at large deflection angles $\delta$. The structure according to FIG. 1 would not be able to show any recognizable play of color even in direct sunlight and even with deliberate observation. However, it must be demanded of a decoration that it becomes effective to some extent under normal conditions.

It is also the case, however, that there is frequently no recognizable play of color in spacial surface structures that have steep edges. Under normal illumination, light originates from more or less extended surfaces: windows, unshielded lamps, walls. The angular deviation that is caused by the origin of the light from different directions is normally substantially larger than the effects of beam splitting (FIG. 2). That is to say light of all spectral colors falls onto the eye of the observer. The colors supplement the original light coloration and all play of color disappears. This is the reason why cut glass can be presented extremely beautifully by means of spot illumination while seldom exhibiting colors in daily use.

A similar disappearance of colors takes place when the spacial surface structures are too small. In this case, the eye of the observer integrates to form a resultant color (e.g. autotype), so that it only makes sense to use spacial surface structural elements which extend laterally a distance of more than 1 millimeter.

SUMMARY OF THE INVENTION

It is the object of the invention to create a decorated object which, has a play of color which is controlled by spacial surface structure (unevennesses). The play of color is to become effective under normal illumination conditions, and also to occur on flat structures.

The object is achieved according to the invention when a) an optical interference layer system which consists of at least three layers of alternating refractive indices are applied directly on the surface structure of an object to be decorated, and b) the distance between crests of unevennesses on the spacial surface structure typically extend laterally more than 1 millimeter. The essence of the invention consists in that 1. an interference layer system exhibits a typical angular dependence for its optical properties and 2. the normal methods of producing an interference layer system cause a functional dependence of the layer thickness on angle/height, these functional dependencies in turn influencing the optical properties, so that a play of color controlled by the spacial surface structure occurs owing only to the arrangement angle/height thicknesses and distances between unevennesses of an interference layer system on the surface structure of the object to be decorated.

DETAILED DESCRIPTION OF THE PREFERRED EMBODIMENTS

Figure 1:
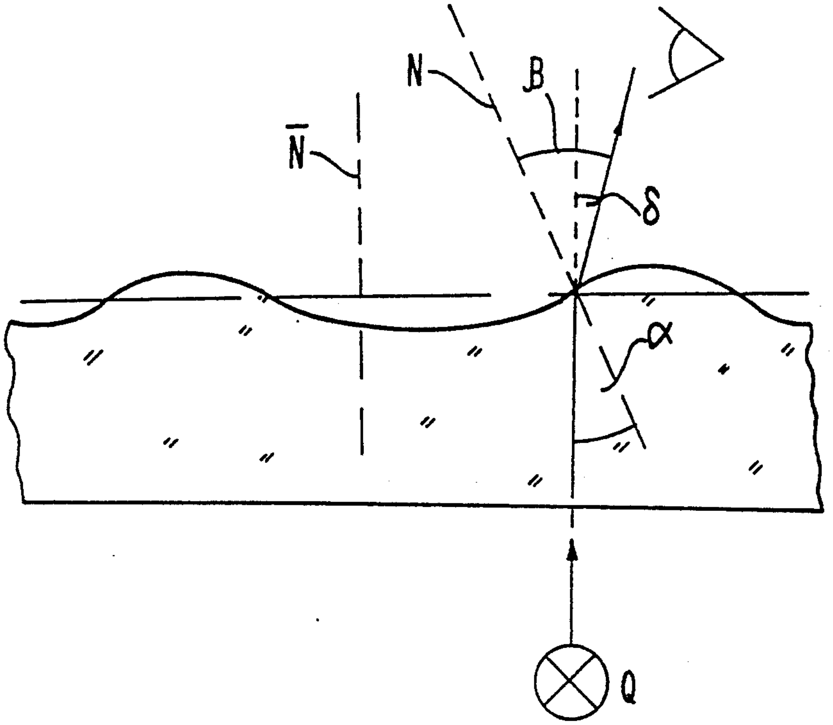
FIG. 1 and FIG. 2 show spacial surface structures used to explain the principles of the present invention.
Figure 2:
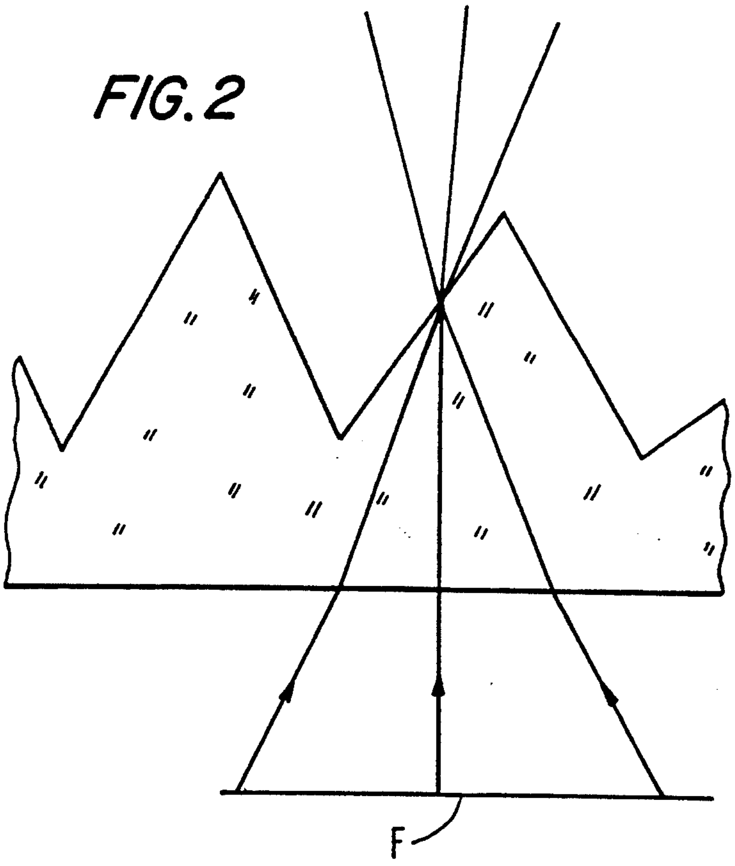
Figure 3:
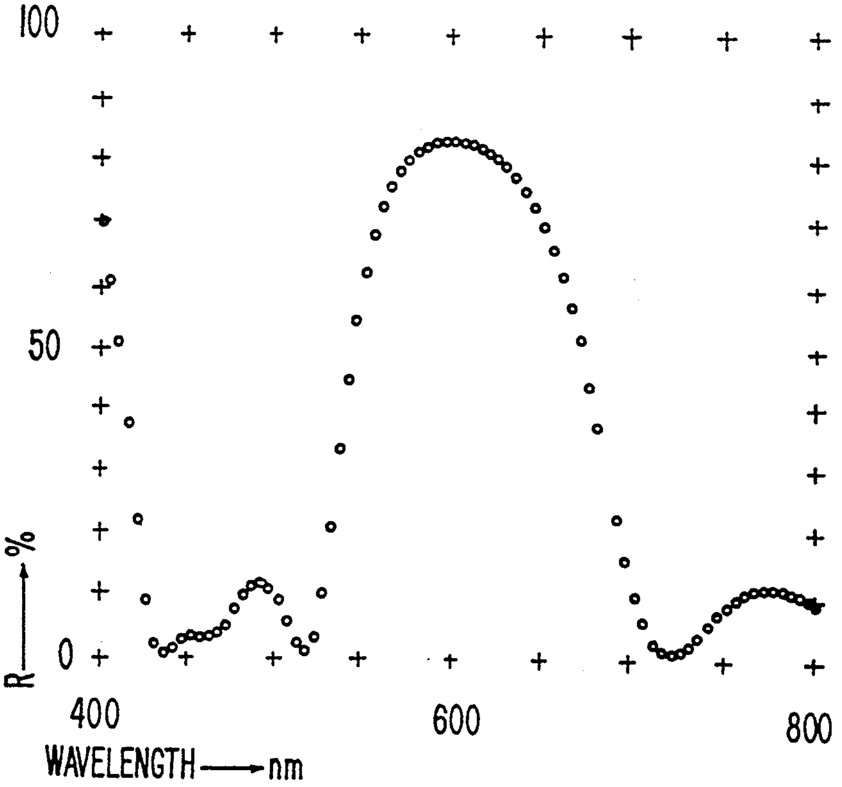
FIG. 3 shows the percentage of light reflected from a spacial surface structured region at various wavelengths of ambient light in accordance with the present invention.

The layer system is vapor-deposited on a body having an unevenly structured surface. The normal vapor-deposition installations are constructed such that they produce layer thicknesses that are as even as possible. That is to say, the substrate is sufficiently far removed from the source. A functional dependence of the layer thickness on the height of the unevenness is therefore disregarded. However, the layer thickness is functionally dependent on the angle between the surface normal and the direction of vapor deposition. Assuming vapor deposition in the direction of the averaged surface normal, the result for spacial surface structured regions having a parallel surface normal is a functional dependence of the reflection according to FIG. 3. In surface structured regions whose surface normal is inclined with respect to the averaged normal, it must be taken into account that 1. the layer thickness is decreased by the factor cos ($\alpha$) and 2. the light falling on the eye of the observer originates from a reflection with the angle of incidence.

Figure 4:
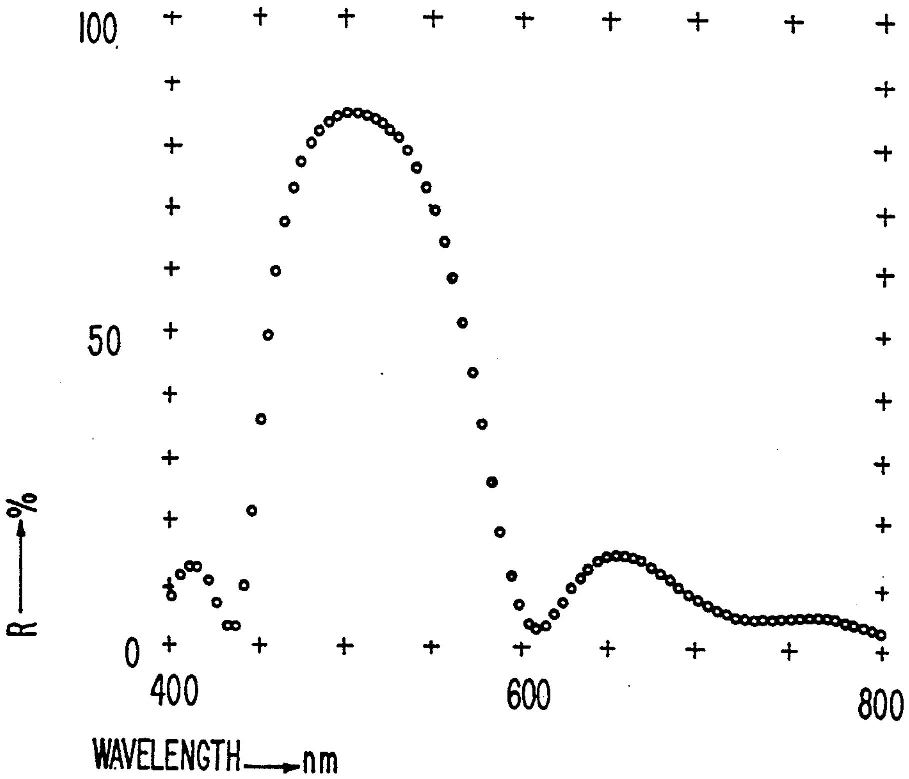
FIG. 4 shows the percentage of light reflected from another spacial surface structured region at various wavelengths of ambient light in accordance with the present invention.

The associated reflection for $\alpha=30°$ is shown in FIG. 4. Between FIG. 3 and FIG. 4, the reflection maxima are shifted from orange (via yellow) to green. This is not an effect to be overlooked given the sensitivity of the eye towards color differences. This case corresponds to the assumption that in the direction of the averaged surface normal the individual layer thicknesses have a constant magnitude from which the layer thicknesses in the direction of the respective surface normal can be calculated by multiplying by the cosine of the respective angle of inclination.

The case in which the layer thicknesses of the individual layers have a constant magnitude in the direction of the respective surface normal is less important, since all coating methods which operate using a single source are directionally oriented in principle. However, even when the layer thicknesses are independent of the respective inclination of the surface normal there is an angular dependence of the optical properties. This dependence arises from the circumstance that the angle of incidence of the light varies when the inclination of the surface normal varies. However, the angle of incidence is a physical quantity which influences the optical property of the layer system. Conversely, it is even impossible to specify an (angularly dependent) layer thickness function for which all color effects disappear. Such a function would be capable of being specified only for one direction of polarization of the light, either for the s-component or for the p-component.

Pronounced and virtually arbitrary plays of color can be produced in the case when the thickness of the individual layers is a function of the height of the unevenness, since the layer thicknesses are decisive parameters for the optical properties of a layer system.

LIST OF DESIGNATIONS

N: Respective surface normal
$\bar{N}$: Averaged surface normal
$\alpha$: Angle of incidence, Angle of inclination
$\beta$: Angle of refraction
$\beta_F$: Angle of refraction for wavelength 486 nm
$\beta_C$: Angle of refraction for wavelength 656 nm
$\beta_F$-$\beta_C$: Beam splitting
$\delta$: Beam deflection
Q: Point light source
F: Bright area
R: Reflection in %
n: Refractive index

TABLE 1

| $\alpha$ | 5 | 10 | 20 | 30 | 37 |
|---|---|---|---|---|---|
| $\beta_F$ | 8.142 | 16.39 | 33.76 | 54.34 | 77.94 |
| $\beta_C$ | 8.056 | 16.21 | 33.36 | 53.51 | 75.40 |
| $\beta_F - \beta_C$ | 0.086 | 0.18 | 0.4 | 0.83 | 2.54 |
| $\delta$ | 3.1 | 6.3 | 13.6 | 23.9 | 39.7 |

All angles in °
Refractive indices for flint
F: 486 nm n = 1.625
C: 656 nm n = 1.608

I claim:

1. A decorated object having a surface structure which is formed by unevennesses of the surface, wherein
   a) an optical interference layer system which consists of at least three layers of alternating refractive index is applied directly on the surface structure, and
   b) the unevennesses typically extend laterally to more than 1 millimeter.

2. The object as claimed in claim 1, wherein the layer thicknesses of the individual layers have a constant magnitude in the direction of the respective surface normal.

3. The object as claimed in claim 1, wherein the layer thicknesses of the individual layers have a constant magnitude in the direction of the averaged surface normal.

4. The object as claimed in claim 1, wherein the layer thicknesses of the individual layers are determined by a function of the respective height of the unevenness.

5. The object as claimed in claim 1, wherein the layer system or individual layers of the system consist of a layer with an inhomogeneous refractive index.

* * * * *

UNITED STATES PATENT AND TRADEMARK OFFICE

CERTIFICATE OF CORRECTION

PATENT NO. : 5,227,220

DATED : Jul. 13, 1993

INVENTOR(S) : Biedermann

It is certified that error appears in the above-indentified patent and that said Letters Patent is hereby corrected as shown below:

On the title page, in the Foregin Application Priority Data, Item 30: Change "4041159" to --4014159.4--.

Signed and Sealed this

Twenty-eighth Day of September, 1993

Attest:

BRUCE LEHMAN

*Attesting Officer* *Commissioner of Patents and Trademarks*